United States Patent [19]

McWilliams

[11] 3,808,782
[45] May 7, 1974

[54] SHREDDER ADAPTOR
[75] Inventor: Larry L. McWilliams, Tulsa, Okla.
[73] Assignee: S &M Enterprises Inc., Tulsa, Okla.
[22] Filed: May 21, 1973
[21] Appl. No.: 362,438

[52] U.S. Cl.................. 56/16.9, 56/503, 83/444
[51] Int. Cl............................................ A01d 35/26
[58] Field of Search ............ 56/229, 255, 500, 501, 56/502, 503, 16.8, 16.9; 83/444; 241/186 R

[56]  References Cited
UNITED STATES PATENTS
2,861,611  11/1958  Considder............................ 83/444
3,240,247  3/1966  Considder......................... 56/500 X
3,716,089  2/1973  Bateman................................ 56/501

Primary Examiner—Russell R. Kinsey
Attorney, Agent, or Firm—Head & Johnson

[57] ABSTRACT

Apparatus for utilizing a rotary type lawn mower for shredding leaves, twigs, grass cuttings and so forth, the lawn mower housing horizontal portion having an opening therein, an adapter attachment affixed to the upper surface of the housing surrounding the opening, an upwardly extending chute detachably secured to the adapter attachment means whereby leaves, grass cuttings, etc. inserted into the chute passes downwardly and into the mower below the housing and a lid for closing the adapter attachment means when the chute is not attached permitting the lawn mower to be used in the normal fashion.

5 Claims, 5 Drawing Figures

3,808,782

SHREDDER ADAPTOR

BACKGROUND, SUMMARY AND OBJECTS OF THE INVENTION

Good lawn care and maintenance requires that grass cuttings, leaves, twigs and so forth be raked and removed from the lawn. This can be done directly, that is, the cuttings, leaves, twigs, can be accumulated and hauled off, however, because of the relatively large bulk of such organic material disposing of the material is a difficult problem to most homeowners. In addition, material disposed in bulk has little value whereas, if the same material is chopped into small pieces it is easier to remove and transport and in addition, serves as a basis for forming compost.

Shredders and choppers have long been utilized for the purpose of cutting organic matter into small pieces to reduce the volume and to enhance the use therefore for composting. Machines having rotating cutting blades with hoppers for feeding the material into the machine are well known. The only problem is that such machines are relatively expensive and require the homeowner to have an extra apparatus utilizing a motor which must be maintained. In addition, the homeowner, of course, having a shredder or chopper machine has the problem of storing it.

This invention provides a means of adapting a normal rotary lawn mower for use as a shredder or chopper. The invention can be applied by attachment to an existing lawn mower or it can be incorporated in the design of the mower when manufactured. The device utilizes the lawn mower to shred leaves, twigs, grass cuttings and so forth in an arrangement wherein the shredding is accomplished without the use of an ancillary machine and in a way such that the normal use of the rotary lawn mower is not impaired. In addition, it provides a means of having both a lawn mower and a shredder in a single piece of equipment thus eliminating duplicate maintenance and storage for the homeowner, and at a substantial saving in cost.

It is therefore an object of this invention to provide a shredder for organic material. More particularly, an object of this invention is to provide a rotary lawn mower adapted for use as a shredder.

Still more particularly, an object of this invention is to provide an apparatus for adapting a rotary lawn mower for use as a shredder while at the same time maintaining the lawn mower for its normal use.

These general objects, as well as more specific objects of the invention will be fulfilled in the following description and claims, taken in conjunction with the attached drawings.

DESCRIPTION OF THE VIEWS

DETAILED DESCRIPTION

Figures 1, 2, 3:
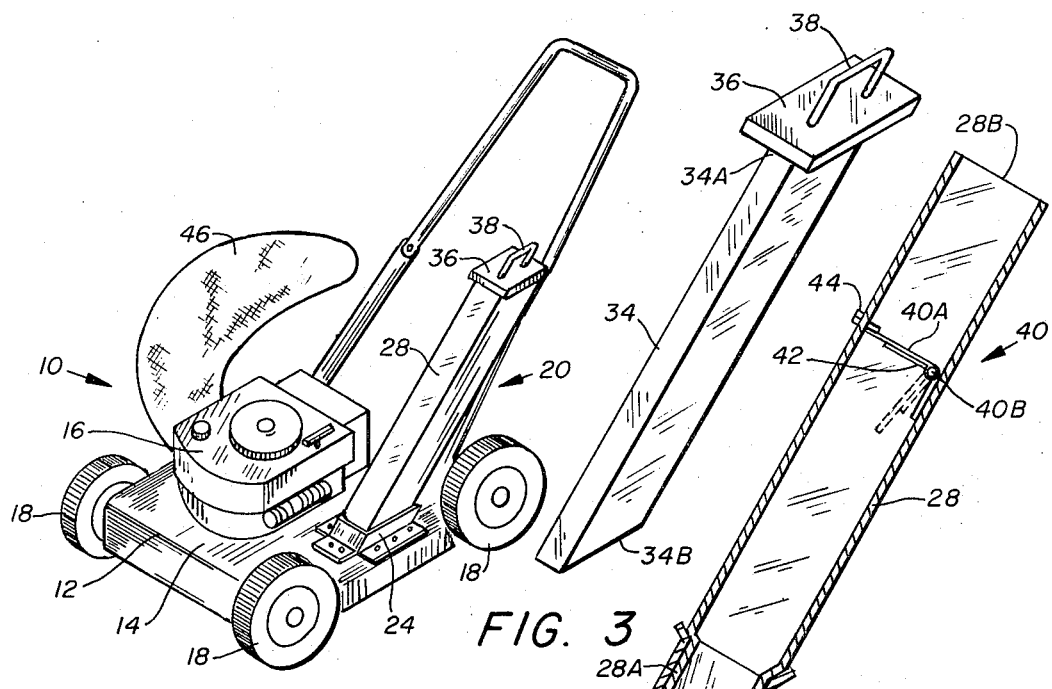
FIG. 1 is an isometric view of a typical rotary lawn mower showing the shredder adapter of this invention affixed thereto.
FIG. 2 is a cross-sectional view of a shredder adapter.
FIG. 3 is an isometric view of a stuffer stick which may be utilized in forcing organic matter from the shredder adapter chute into the mower.

Referring to the drawings and first to FIG. 1, a typical rotary lawn mower is shown indicated generally by the numeral 10. The mower 10 has a frame 12, the frame having a horizontal portion 14. Mounted on the horizontal portion 14 is an engine 16. In the illustrated arrangement the engine 16 is gasoline powered, however, an electric motor may be equally as well utilized.

Wheels 18 are attached to the frame 12 as support for moving the mower over a lawn. The mower includes a shaft (not shown) extending downwardly through the frame horizontal portion 14 with a horizontal blade (not shown) affixed to the shaft and rotated below the horizontal portion 14. As the mower is moved over the ground the rotating horizontal blade cuts the grass to an even height.

The lawn mower described up to this point is a typical rotating blade lawn mower. In some mowers the blade is affixed to a shaft displaced from the crank shaft of the engine 16 so that the vertical shaft to which the horizontal blade is attached is driven by a belt or gears. In such arrangement the engine shaft is usually horizontal rather than vertical. The present invention is adaptable to any mower having a rotating horizontal blade rotating below a horizontal portion 14 of a frame and the means whereby the horizontal blade is rotated by an engine is not relevant to the invention.

The shredder adapter of this invention is illustrated in an embodiment attached to mower 10, the shredder adapter being generally indicated by the numeral 20. As seen best in FIG. 2, the mower frame horizontal portion 14 has an opening 22 therein. An adapter attachment member 24 is attached to the upper surface 14A of the horizontal frame portion 14. The adapter attachment means 24 can be in a variety of shapes but preferably provides a short upwardly extending opening 24A which communicates with opening 22 in the housing horizontal portion. In the illustrated arrangement the adapter attachment member 24 provides a rectangular internal opening 24A and is formed of metal secured to the housing portion 14 by means of bolt 26.

Removably received in the internal surface 24A of the adapter attachment member is an upwardly extending chute 28, opened at the top and the bottom. The bottom portion is configured at 28A to be slidably or telescopically received in the internal surface 24A of the adapter attachment member 24. The upper opened top 28B of the chute is designed to receive organic matter, such as grass cuttings, leaves, twigs and so forth. Organic matter placed in the chute passes downwardly through opening 22 in the housing and into the lower portion of the mower where it is engaged by the rotating blade (not shown) of the mower and thereby ground into smaller particles.

Figures 4, 5:
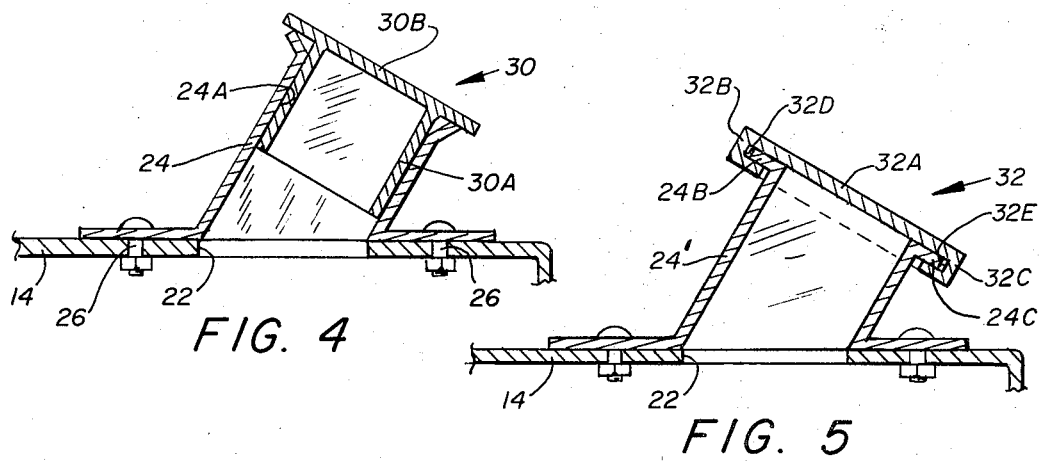
FIG. 4 is a cross-sectional view of the adapter attachment member showing a lid for closing the member when the lawn mower is not being used for shredding.
FIG. 5 is a cross-sectional view as shown in FIG. 4 showing an alternate arrangement of providing a lid for closing the adapter attachment member when the lawn mower is to be utilized for normal mower purposes.

When the lawn mower is to be used for the normal purpose of cutting grass the chute 28 is removed and the adapter attachment member 24 closes so that objects struck by the rotating blade cannot be ejected out through openings 22. FIGS. 4 and 5 show two illustrations of means of providing lids for closing the adapter. In the arrangement of FIG. 4 the lid generally indicated by the numeral 30 includes a short telescopically extending portion 30A which slidably and snugly is received in the interior surface 24A of the adapter attachment member. The upper end of the telescopically extending portion 30A is closed by portion 30B. When the mower is to be used for shredding the lid 30 is pulled out of the attachment member 24 and chute 28 inserted into it. When the mower is not being used for shredding the lid 30 is positioned in the adapter attachment member.

FIG. 5 shows an alternate arrangement of providing a lid. In this arrangement the adapter attachment member 24' includes opposed extending integral lip portions 24B and 24C. The lid generally indicated by the numeral 32 is in the form of a flat portion 32A having integrally downwardly and inwardly extending portions 32B and 32C on opposite sides and providing spaced parallel recesses 32D and 32E. The recesses 32D and 32E slidably receive the lip portions 24A and 24B of the attachment member. When the mower is to be used for mowing the lid 32 is slipped into place to prevent objects being thrown out opening 22 whereas, when the mower is to be used for shredding the lid 32A is slipped out of position and chute 28 inserted into the attachment member 24.

When leaves, grass cuttings and so forth are placed in the upper opened end 28B of the chute there may be a tendency for the material to become lodged or stuck so that it does not pass freely through the chute and opening 22 into the lower portion of the mower. To assist in urging the organic matter placed in the chute through the opening 22 a stuffing stick may be used as shown in FIG. 3. The stuffing stick is indicated by the numeral 34 and includes an upper end 34A and a lower working end 34B. At the upper end 34A is an attached vertically extending stop portion 36 having dimensions greater than that of the upper open end 28B of chute 28. A handle 38 is affixed to the upper end of the stuffing stick 34.

The length of the stuffing stick measured from the working end 34B to the stop portion 36 must be equal to or less than the distance measured from the upper open end 28B of chute 28 to opening 22 in the mower housing horizontal portion. In this way, when stuffing stick 34 is positioned in the chute to force organic material down through it the possibility of extending the stick so that it would be engaged by the mower blade is eliminated. The cross sectional configuration of stuffing stick 26 will depend upon the configuration of the chute 28. While in the drawings the chute 28 is shown to be rectangular in cross section it can be seen that it can be of any desired cross sectional configuration such as round, square, oval, or so forth.

An additional alternate arrangement of the invention as illustrated in FIG. 2 includes a closure means generally indicated by the numeral 40 positioned internally of chute 28 intermediate the upper and lower ends thereof. The closure means include a flapper 40A which normally extends substantially perpendicular the length of the chute and is hinged at 40B to one interior side of the chute. A spring 42 normally urges the flapper portion 40A in a position substantially perpendicular to the length of the chute but the spring permits the flapper to readily pivot downward when organic material is being forced past it into the mower. A small bolt 44 extends through the chute side opposite to that to which hinge 40B is attached to service a stop against which a flapper portion 40A engages as it is forced upwardly by the spring 42. Another arrangement is to provide the length of flapper 40A slightly longer than the internal width of chute 28 so the flapper normally extends slightly downwardly but is prohibited from pivoting fully upwardly and thus a stop 44 is not needed. The closure 40 assures that no object will be kicked upwardly by the mower rotating blade through the chute to possibly cause injury. When organic matter is placed in the upper end of the chute and pushed downwardly by means of stuffing stick 34 the closure 40 is opened readily permitting the passage of the organic matter and then the closure 40 immediately closes when the stuffing stick is withdrawn.

The adapter attachment means 24 is preferably arranged such that when chute 28 is attached to it the chute extends at an angle relative to the mower horizontal portion 14 so that the upper end of the chute is displaced away from the mower. In this way the operator can use the shredder adapter without the worry of his feet extending underneath the mower.

There are several ways in which the shredder adapter may be used. If the mower includes a grass catcher means 46 as shown in FIG. 1, such as a cloth bag 46. Such may be used to catch cuttings. If the mower does not include this device it may be placed on a large plastic sheet on a flat surface. The cuttings will accumulate beneath the mower and gradually be forced out from under it. After the organic matter has been cut the mower may be removed off the plastic sheet and the sheet used to carry the organic matter which has been shredded. A third way is to merely shred the organic matter on the ground and then shovel or rake it into a container.

FIG. 2 shows the chute 28 has an end portion of reduced cross section which is adapted to be disposed within adapter attachment member 24. It can be seen that as an alternative the chute could be provided with externally extending protrusions or dimples as a means of limiting the downward reception of the chute in the attachment member. In addition to the arrangements of FIGS. 4 and 5 the lid 32 may be hinged to the adapter and held in closed position by dimpled locks or parallel sides. These alternate arrangements demonstrate that the principles of the invention may be practiced in many different physical embodiments.

While the invention has been described with a certain degree of particularity it is manifest that many changes may be made in the details of construction and the arrangement of components without departing from the spirit and scope of this disclosure. It is understood that the invention is not limited to the embodiment as set forth herein for purposes of illustration, but is to be limited only by the scope of the attached claim or claims, including the full range of equivalency to which each element thereof is entitled.

What is claimed is:

1. With a lawn mower having a frame supported by wheels and having a horizontal portion, a vertical drive shaft supported by a bearing mounted in an opening in said frame horizontal portion, a horizontal blade supported to and rotated by said drive shaft below said housing horizontal portion, and a prime mover connected to said drive shaft for the rotation thereof, said housing horizontal portion having an opening therein spaced from said shaft, an adapter for shredding organic matter such as leaves, grass cuttings, and twigs, comprising:

an adapter attachment member affixed to the upper surface of said housing horizontal portion surrounding said opening;

an upwardly extending chute open at the top and bottom, the lower end of the chute being removably attachable to said adapter attachment means, the chute being adaptable to receive organic matter therein, the organic matter passing downwardly through said opening and into the mower below said frame horizontal portion; and lid means for closing said adapter attachment member when said chute is not attached.

2. An adapter for shredding organic matter as in claim 1 including a stuffing stick for pushing organic matter placed in said chute through said opening in said frame horizontal portion, the stuffing stick having a handle end and a working end, said stuffing stick having a vertically extending stop portion adjacent the handle end, the length of said stick from said stop portion to said working end being equal to or less than the length of said chute whereby the working end of said stuffing stick is prevented from engaging the mower blade.

3. An adapter for shredding organic matter as in claim 1 including a closure means hinged to the interior of said chute intermediate the upper and lower end, the closure means being pivotal between a normal closed position blocking the passage of objects upwardly through said chute and an opened position permitting passage of organic matter downwardly through said chute; and spring means normally retaining said closure means in the closed position.

4. An adapter for shredding organic matter according to claim 1 wherein said adapter attachment member is in the form of a short, upwardly extending open top housing and wherein said lid means includes a short telescopically extending portion slidably and snugly receivable within said adapter housing, the upper end of said telescopically extending portion being closed.

5. An adapter for shredding organic matter according to claim 1 wherein said adapter attachment member is in the form of a short, upwardly extending open top housing, the upper end thereof terminating with oppositely extending integral lip portions, and wherein said lid means is in the form of a flat member having integrally downwardly curved portions on opposite sides thereof providing spaced, paralleled recesses slidably receiving said housing lip portions.

* * * * *